H. J. WOODMAN.
WATER METER.
APPLICATION FILED SEPT. 23, 1914.
1,164,441.
Patented Dec. 14, 1915.
3 SHEETS—SHEET 1.
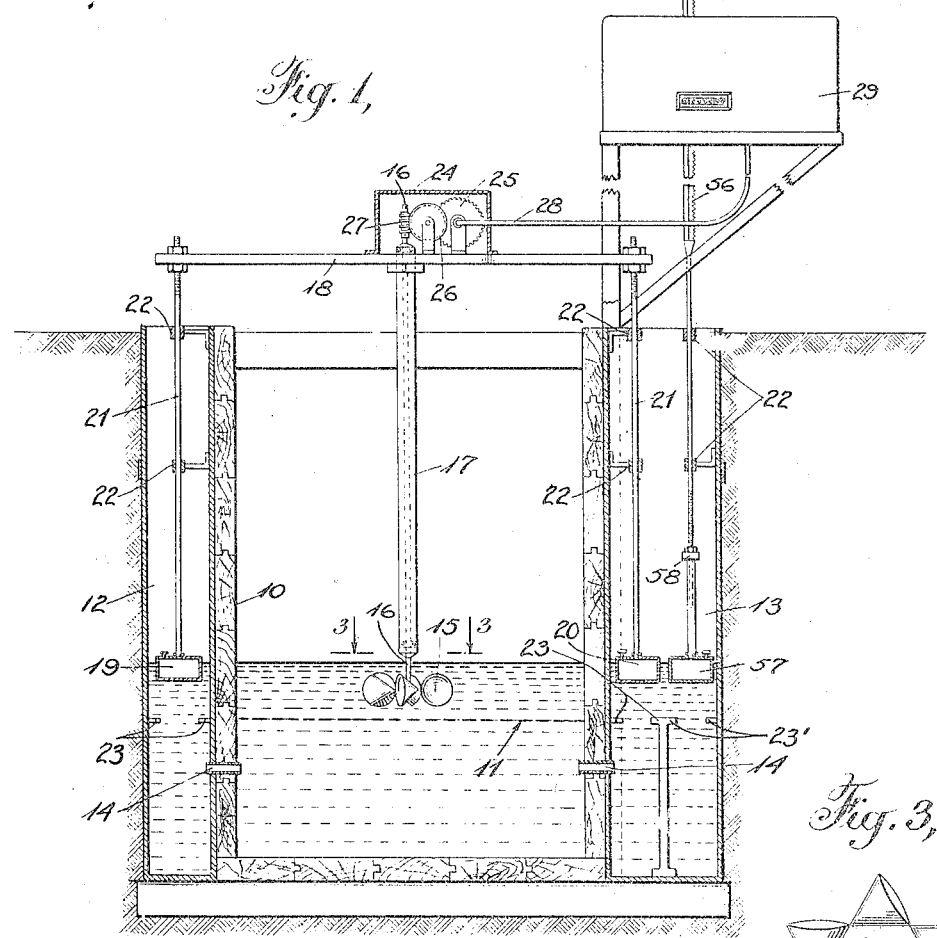
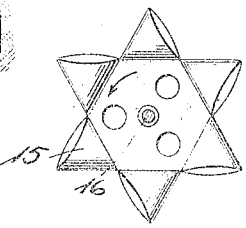
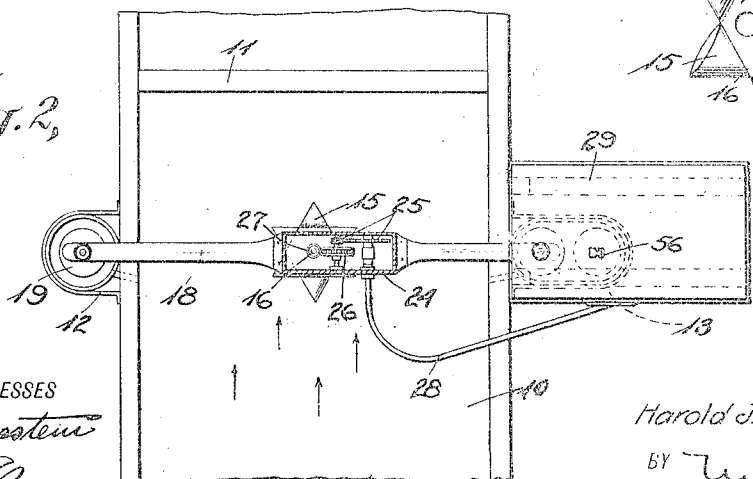
WITNESSES
INVENTOR
Harold J. Woodman
BY
ATTORNEYS

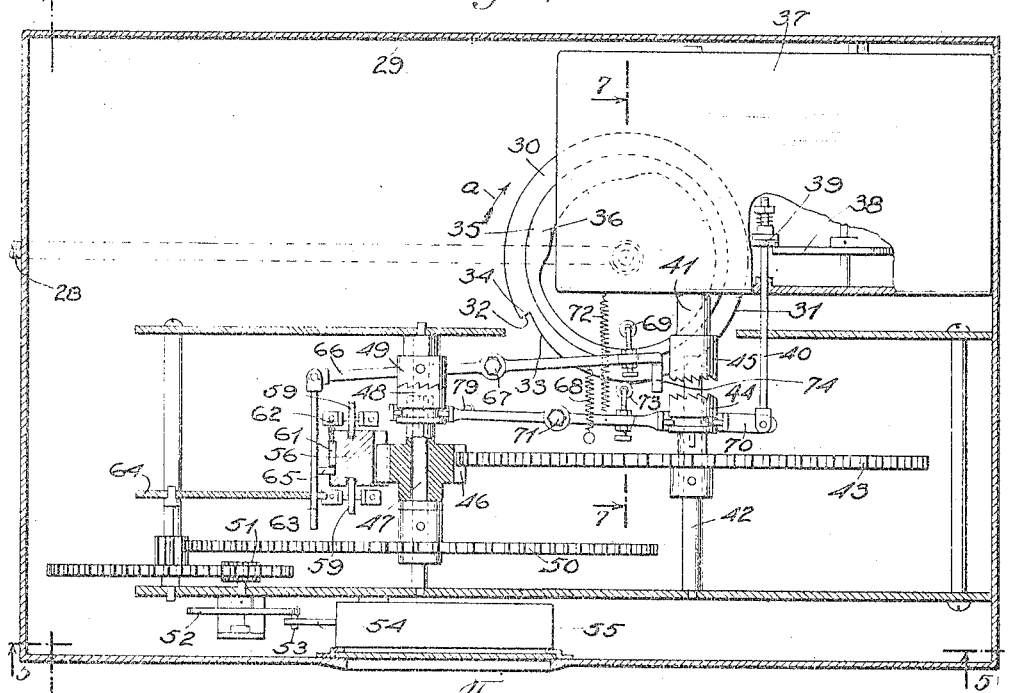

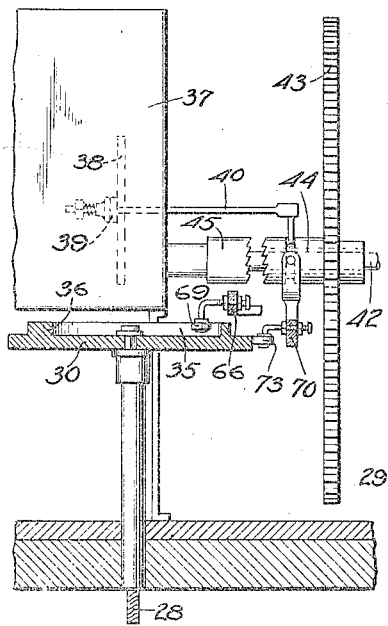
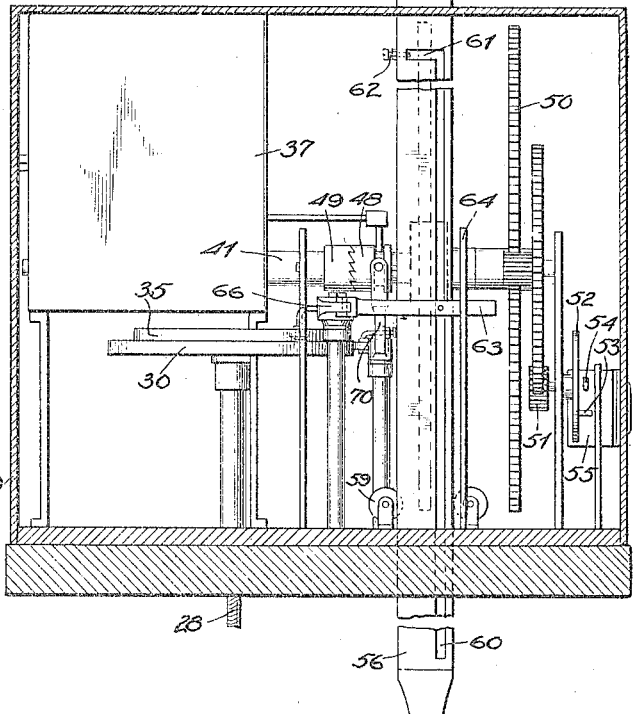
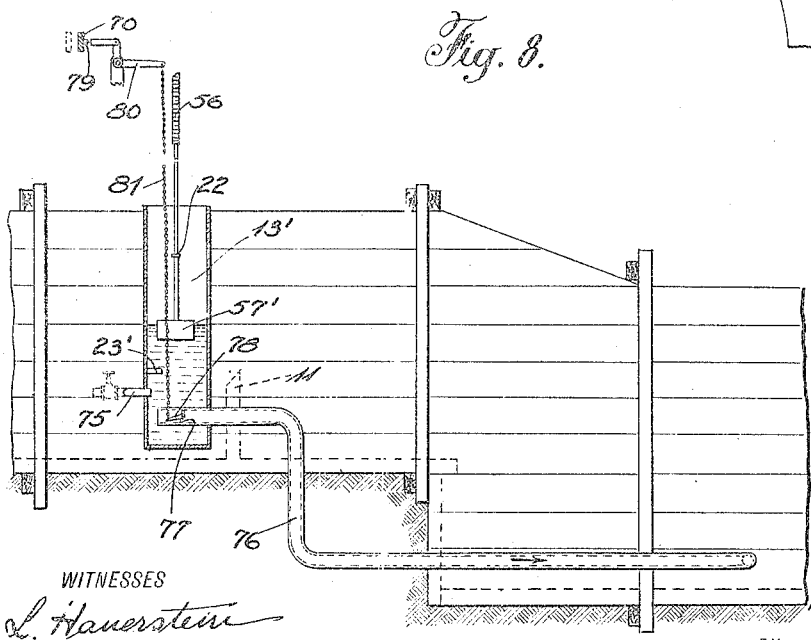

UNITED STATES PATENT OFFICE.

HAROLD JOSEPH WOODMAN, OF MINATARE, NEBRASKA.

WATER-METER.

1,164,441. Specification of Letters Patent. Patented Dec. 14, 1915.

Application filed September 23, 1914. Serial No. 863,081.

*To all whom it may concern:*

Be it known that I, HAROLD J. WOODMAN, a citizen of the United States, and a resident of Minatare, in the county of Scotts Bluff and State of Nebraska, have invented a new and Improved Water-Meter, of which the following is a full, clear, and exact description.

This invention relates to water distribution and has particular reference to land irrigation.

More particularly stated, the invention comprises novel and peculiar means for automatically, or practically automatically, registering the amount of water delivered from an irrigation ditch for individual use by the irrigator.

Among the objects of the invention is to provide a simple, and hence easily understood, mechanism for individual use of an irrigator to enable him in a plain, intelligible manner to understand the character of the service which he is receiving from the organization supplying the water. In other words, a rotary wheel is placed in the water and is maintained by the water at a definite elevation below the surface thereof irrespective of the rise or fall of the water in the main body or ditch. From this wheel a rotary cam wheel is operated at a relatively slow speed, and this cam wheel checks off the distance interval of water passing through the weir box which is of a definite width. The cam wheel furthermore determines the automatic rise and fall of means for registering the depth of the water flowing over the weir.

The details of construction will be hereinafter more fully set forth and claimed and illustrated in the accompanying drawings forming a part of this specification in which like characters of reference indicate corresponding parts in all the views, and in which—

Figure 1 is a vertical transverse section of the water compartments, certain of the parts being shown in elevation; Fig. 2 is a plan view of the same; Fig. 3 is a plan view of one form of water wheel which may be used; Fig. 4 is a horizontal sectional view of the aforesaid cam wheel and parts associated therewith; Fig. 5 is a vertical section on the line 5—5 of Fig. 4; Fig. 6 is a vertical transverse section on the line 6—6 of Fig. 4; Fig. 7 is a vertical sectional detail on the line 7—7 of Fig. 4; and Fig. 8 is a side view, partly in section, of a modification.

The several parts of this device may be made of any suitable materials, and the relative sizes and proportions, as well as the general construction of the mechanism, may be varied to a considerable extent without departing from the spirit of the invention hereinafter more fully described and specifically claimed.

At 10 I show a ditch of any suitable calculated width, through or along which irrigation water is delivered to and over a weir 11, whence such water may be conveyed in any usual or preferred manner to the places of use. Suitably disposed on either side of the ditch 10 are vertical tanks 12 and 13 into which water is delivered from the main ditch through pipes 14 and whereby the depth of water in these tanks 12 and 13 is maintained substantially the same as in the ditch. The primary purpose for these side tanks is to determine the elevation of a water wheel 15 within the main body or current of water. This wheel is connected to the lower end of a vertical shaft 16 mounted preferably upon roller bearings within a tubular casing 17. The upper end of the casing is secured rigidly to a cross bar 18 extending across the top of the ditch. A pair of floats 19 and 20 operating in the respective tanks 12 and 13 are connected to the cross bar by means of rods 21 slidable in fixed guideways 22 and having means at their upper ends for varying the effective length of the rods according to the depth at which the wheel is wished to be operated below the surface of the water. Sets of lugs or similar stop means 23 are provided within the side tanks at a certain predetermined elevation with respect to the crest of the weir. These lugs limit the downward movement of the floats and water wheel. The floats, it will be understood, rise with the water and hence hold the water wheel at a predetermined depth below the surface thereof.

At 24 I provide a gear casing of any suitable nature secured upon the cross bar 18. Within this casing are arranged reduction gears of any suitable nature illustrated as comprising spur gears 25, a worm gear 26 and a worm 27, the worm being secured to the aforesaid vertical shaft 16. A flexible shaft 28 is connected to the last gear element 25 and extends from the gear casing and thence laterally in any suitable direction to a controller casing 29 preferably fixed in rigid position upon the framework of the ditch adjacent the tank 13. Within the controller casing is a cam wheel 30 shown in this case as being arranged in a horizontal plane and driven continuously during the flow of water through the ditch and over the weir, by reason of the connection between it and the flexible shaft 28. This cam wheel is substantially flat or disk-like and has a circular periphery 31 broken only by a comparatively short space formed by a notch 32. In other words, the periphery 31 may be regarded as a cam of almost circular extent and beginning in a short eccentric portion 33 and ending at a shoulder 34. Upon one side of the main cam body I provide a flange 35 having a circular periphery and provided on its inner portion with an inwardly projecting cam 36. This latter mentioned cam begins at a point substantially diametrically opposite from the eccentric portion 33 of the first cam and terminates not far remote from the shoulder 34, the direction of rotation of the cam wheel being indicated by the arrow $a$, Fig. 4. Adjacent the cam wheel 30 and preferably within the controller casing 29 is provided a motor casing 37 when the device is to be used in connection with slow or "dead" ditches. Any suitable motor may be provided, such as a spring motor to be wound, say, every seven or eight days, and including a brake wheel 38 adjacent which is a brake shoe 39 connected to a bar 40. The main motor shaft is shown at 41 and journaled in alinement therewith is a countershaft 42 upon which is fixed a large gear 43. A clutch member 44 splined and slidable on the countershaft is adapted to make engagement with another clutch element 45 secured to the motor shaft, whereby the gear wheel 43 may be driven at times by the motor. A pinion 46 is mounted loosely upon the shaft 47 parallel to the motor shaft and a clutch member 48 is splined to the hub of the pinion 46. Another clutch element 49 adapted at times to coöperate with the member 48 is secured to the shaft 47 through which a gear 50 may be driven. This gear 50 is the first element of a train of reduction gears of which the pinion 51 is the last element. To this pinion is connected a disk 52 having a lug or finger 53 which, at every rotation of the pinion 51, operates the lever 54 of an automatic counter 55 of any suitable type and adapted to register whole numbers and hundredths. For practical purposes I have arranged for the counter to indicate as the unit of measurement hundredths of feet corresponding to the depth of the current of water flowing over the crest of the weir.

At 56 I show an actuator or vertical rack meshing constantly with the pinion 46 and carrying at its lower end a float 57. The means for connecting this float to the rack bar comprises an adjustable nut 58 through which and the variation in the buoyancy of the float, a predetermined delicacy of adjustment may be provided for the operation of the rack as will be better appreciated as this description proceeds. The rack is guided for vertical reciprocations in guides 22 and also by antifriction rollers 59 within the controller casing. These rollers confine the rack to reciprocations in a definite position. The face of the rack opposite the pinion 46 is provided with a groove 60 which terminates at its upper end in a short horizontal groove 61. The effect in length of this horizontal groove 61 may be determined by a set screw 62 projecting into the same from one side. A bar 63 is guided in a plate 64 of the framework and reciprocates therethrough substantially parallel to the axis of the shaft 47. This bar carries a finger 65 which is held in the aforesaid grooves 60 and 61 by said plate and a lever 66 pivoted at 67. A strong spring 68 acts normally upon said lever 66 tending to cause the finger 65 to enter the transverse groove 61 where it will be stopped by the set screw 62. This lever also carries an antifriction roller 69 adapted to coöperate with the cam 36 and through which the lever is so swung on its pivot as to cause the finger 65 to pass out of the groove 61.

A lever 70 pivoted at 71 has yoke connections at or adjacent its opposite ends with the aforesaid slidable clutch members 44 and 48. This lever adjacent the clutch member 44 is connected to the aforesaid bar 40. A spring 72 acts upon this lever tending to cause the clutch members 44 and 45 to engage and the members 48 and 49 to separate. This lever also carries an antifriction roller 73 which coöperates with the cam 31 to hold the clutch members 44 and 45 disconnected until the roller 73 passes the shoulder 34 and drops into the notch or depression 32. When the aforesaid stronger spring 68 acts upon the lever 66 to cause the finger 65 to enter the groove 61, it also causes the lever 70 to swing on its pivot to separate the clutch members 44 and 45 by reason of a shoulder 74 irrespective of the spring 72 and roller 73.

With the foregoing description of the mechanism, the operation of the device may be summarized briefly as follows: With the rotation of the cam wheel in the direction already indicated and operating constantly at a slow predetermined speed proportional to the velocity of the current, when the roller 73 drops into the notch 32, the spring 72 will cause the engagement of the clutch elements 44 and 45 and simultaneously will start the motor by releasing the brake shoe 39. The motor then will cause the rack 56 to be forced downwardly through the operation of the gear 43 and pinion 46 until the float 59 is stopped by suitable stop lugs 23', the location of which will correspond precisely to the crest of the weir, and at which time the finger 65 will pass into the groove 61, the parts being so proportioned or adjusted as to insure this effect. When, therefore, the rack 56 and its float 57 are forced downwardly to the limit prescribed, the force of the spring 68 will exert itself upon the lever 66 and act to bring the finger 65 into the groove 61, and since the roller 69 will have passed beyond the cam 36, the shoulder 74 will disconnect the clutch 44 or 45 and connect the clutch members 48 and 49. The buoyancy of the water in the tank 13 will then lift the rack 56, the action of which through the pinion 46, clutch members 48 and 49, shaft 47 and gearing 50 to 51 will cause as many rotations of the disk 52 and operations of the actuator lever 54 as the water is hundredths of feet in depth. The gear 43 at this time will rotate idly upon the countershaft 42 and the motor will be held from rotation by the brake 38, 39. When another standard interval of current is checked by the water wheel mechanism, including the cam wheel 30, determined by a single rotation of the cam wheel, the depth registering mechanism will be again set in operation as already described. The counter 55 always indicates the sum of the average depths of the current, and since the speed of the water wheel and time for rotation of the cam wheel may be determined approximately accurately, the quantity of water used will be disclosed by the counter with a very slight amount of calculation. The length of the distance interval of the water passing through the weir box or the standard of the water wheel mechanism may be practically determined by the reduction gearing within the casing 24 and the same may be corrected, as may be necessary according to the season or otherwise, because of changes in the mechanism by reason of corrosion or wear. In any event, the distance interval of the water will be treated as a substantially fixed quantity. By way of illustration, if the counter reads 4,167.82, the width of the weir box 2 feet, and the constant of the cam wheel 30 is 1,427 feet, the quantity of water in cubic feet will be 4,167.82×2×1,427 or 11,894,958.28. It will be understood that the depth indicating devices will be operated once for each distance interval of water and that the repeated actions of the depth indicating means simply sum up the total of the average depths.

Where a loss of head of water is available, the motor 37 may be dispensed with by providing a tank 13' for the float 57' separate from the tank 13 in which the float 20 operates. Water is admitted into this special tank 13' by means of a valved pipe 75, and a discharge pipe 76 is adapted to drain the water from this tank, delivering it below the weir, as shown in Fig. 8. The water is prevented normally from flowing out through this discharge pipe by means of butterfly valve 77 to the axis of which a crank 78 is connected. To the lever 70, as by means of an eyelet 79, is connected a bell crank 80, and the opposite end of the bell crank is connected through a chain 81 to the crank 78. It is to be understood that the same water wheel and counter mechanisms are to be used in connection with this device as were fully described above, or, in other words, the only difference between this modification and the first one is in the substitution of the special tank 13' and its automatically controlled outlet for lowering the rack 56 instead of the motor. When, therefore, the cam wheel 30 makes a complete rotation and allows the wheel 73 to drop into the notch 32, allowing the lever 70 to move on its axis, the chain 81 will be pulled up and the water will flow freely through the discharge pipe. While this takes place the float and rack will move downwardly by gravity until stopped by the lug 23' at the elevation of the crest of the weir. As before, the finger 65 will glide into the transverse groove 61, causing the clutch members 48 and 49 to come into engagement so that when the cam 31 comes into action to set the rack free, the rack will actuate the counter while the level of the water in the tank 13' is restored to that of the ditch.

I claim:

1. In a device of the character set forth, the combination with a ditch construction in which the water is subject to variations in depth and a pair of tanks adjacent the ditch supplied with water from the ditch at a uniform level therewith, of a water wheel arranged in the current of water in the ditch, a pair of floats in said tanks movable up and down therein in accordance with the variations in depth of the water, and rigid means coöperating between said floats and the water wheel to maintain the wheel at a constant distance below the surface of the water.

2. In a device of the character set forth, the combination with a waterway having a weir over which the water is adapted to flow at variable depths, of a cross bar above the waterway, a pair of floats supporting the cross bar at a definite distance above the surface of the water in the waterway, a water wheel supported at a predetermined distance below the surface of the water from said cross bar, fixed stops to limit the movement of the floats and cross bar downwardly at substantially the elevation of the crest of the weir, counting mechanism, and slow speed gearing connections between the water wheel and the counting mechanism.

3. In an automatic water meter, the combination of a water wheel, a cam wheel, driving connections to operate the cam wheel at slow speed constantly from the water wheel, a counter, an actuating member caused to be forced downwardly by the cam wheel at each rotation thereof, and connections between the actuator and the counter to register the extent of movement of the actuator when the same is returned to normal position.

4. In an automatic water meter, the combination of a water wheel, a cam wheel, means to rotate the cam wheel at slow speed from the water wheel, a counter, an actuator serving to actuate the counter when moved in one direction to an extent proportional to the extent of movement of the actuator, and means set in operation by said cam wheel to force said actuator in the opposite direction.

5. In an automatic water meter, the combination of a cam wheel, means to rotate the cam wheel at a uniform slow speed from a current of water of variable depth, a counter to sum up the average depths of the water at regular intervals determined by successive rotations of the cam wheel, a rack adapted to reciprocate according to the depth of the current, connections between the rack and the counter to cause the average depths to be added by the counter, and means controlled by the rotation of the cam wheel to cause the rack to reciprocate.

6. In an automatic water meter, the combination of a cam wheel, means to rotate the same at a uniform speed from a current of water of variable depth, a counter, a rack adapted to reciprocate to an extent proportional to the variations in depth of the water, driving connections between the rack and the counter, said connections including a shiftable clutch and operative to actuate the counter while the rack is moving in one direction, a lever connected to said clutch, and means connected to the lever to cause it to throw the clutch out of operation when the cam wheel completes each rotation.

7. In an automatic water meter, the combination of a cam wheel, means to rotate the cam wheel in a constant manner from a current of water of variable depth, a rack, means to reciprocate the rack in accordance with the variations in depth of water aforesaid, a counter, means to operate the counter to register the extent of movement of the rack in one direction, and means to force the rack in the opposite direction, said last mentioned means including a lever and a clutch operated thereby at each rotation of the cam wheel.

8. In an automatic water meter, the combination of a cam wheel and means to rotate it constantly at a uniform speed from a current of water of variable depth, a motor, means to automatically hold the motor from operation, an actuator adapted to reciprocate in accordance with the variations in depth of the water, connections between the motor and the actuator to force the same downwardly against the buoyancy of the water, said connections being made operative by the cam wheel at each rotation thereof, setting free the motor, means to stop the motor automatically when the actuator reaches a predetermined point of movement in one direction, a counter, and connections between the actuator and the counter to register the extent of movement of the actuator in the opposite direction, substantially as set forth.

In testimony whereof I have signed my name to this specification in the presence of two subscribing witnesses.

HAROLD JOSEPH WOODMAN.

Witnesses:
   THOMAS WRIGHT,
   W. I. TINGLEY.